A. B. GREENWALT.
Crayon-Holder.
No. 196,352.      Patented Oct. 23, 1877.
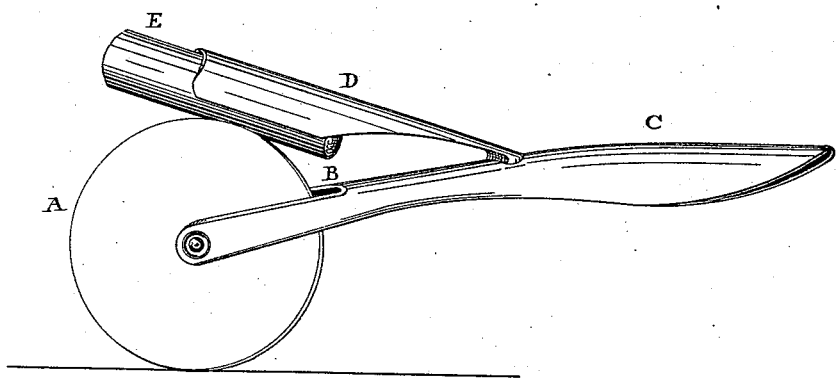

UNITED STATES PATENT OFFICE.

ABRAHAM B. GREENWALT, OF MILLERSVILLE, PENNSYLVANIA.

IMPROVEMENT IN CRAYON-HOLDERS.

Specification forming part of Letters Patent No. 196,352, dated October 23, 1877; application filed April 23, 1877.

*To all whom it may concern:*

Be it known that I, ABRAHAM B. GREENWALT, of Millersville, in the county of Lancaster, State of Pennsylvania, have invented certain Improvements in a Combined Port-Crayon and Chalking Wheel or Disk, of which the following is a specification:

The object of this invention is to give a continuous supply of chalk to a revolving disk, in combination with a spring-like port-crayon attachment for drawing uniform lines on cloth or calico for being quilted or stitched over.

The accompanying drawing, with the letters of reference and a brief explanation, will enable those skilled in the art to make and use the same. The drawing shows a full-sized combination, which, in itself, is very simple, and gotten up at a trifling cost.

A is a circular disk of firm card-board or its equivalent. The handle C is made out of tin plate, bent round, and at B formed by cutting out a slot into two arms, between which the disk is held by a central headed pin, and washer or rivet on the end, on which the disk revolves. D is also of tin plate, bent on the sides above the disk, so as to embrace a chalk or other crayon, E, which latter rests upon the upper edge of the disk, and said holder being made spring-fashion where it connects with the handle C, so as to press gently or hold the chalk in contact with the edge of the disk. If extra pressure is required, it is readily given by the index-finger in holding the device while using it.

In large bed-quilts chalking the lines is always quite a task. To form the squares or lozenges over an extended surface or for quilting dress or other materials, this simple, cheap, and efficient device is found especially adapted and highly desirable, and as a whole it presents a new article to trade, and one that comes so cheap that no family will be without one where sewing is done.

I am aware that the whole thing looks very simple and trifling in its construction, and yet I am not aware that any device combining a chalk or crayon holder with a revolving disk was ever before used or known to supply a demand so greatly needed for quilting. The continuous cutting the chalk or crayon to a point is a loss of time and material which this simple device prevents. It also aids in forming more uniform lines with much greater ease and dispatch; therefore

What I claim as a new article of manufacture is—

The combination of the chalk-holder or port-crayon D, handle C B, and disk A, the whole substantially as and for the purpose specified.

A. B. GREENWALT.

Witnesses:
W. B. WILEY,
JACOB STAUFFER.